3,025,160
ELECTROSTATIC PRINTING
Wilhelm Bunge, Leverkusen-Wiesdorf, Heinrich Seibert, Leverkusen-Bayerwerk, and Hildegard Haydn, Leverkusen, Germany, assignors to Agfa Aktiengesellschaft, Leverkusen, Germany, a corporation of Germany
No Drawing. Filed June 3, 1958, Ser. No. 739,484
Claims priority, application Germany June 8, 1957
1 Claim. (Cl. 96—1)

The present invention relates to electrostatic printing and more particularly to photoconductive materials which are particularly useful in electrostatic printing processes.

Electrostatic printing processes are well known in the art (see R.C.A. Review 15 (1954), pages 462–468, French patent specification 1,113,933; U.S. patent specifications 2,735,784; 2,735,785; 2,727,808; German patent specification 958,355). It is known to produce photoconductive materials for such processes by casting light-sensitive or photo-conductive layers on to suitable supports, from solutions of layer-forming plastics in organic solvents to which are added photoconductive substances. The binder used in such cases must possess an electric specific resistance which is greater than that of the photoconductive substance and greater than the specific resistance of the support. The best results were obtained when using binders which have a specific electrical resistance of at least $10^{10}$ Ω/cm. or more. A silicone resin which is on the market as 60% solutions in aromatic hydrocarbons, for example toluene, has proved to be suitable as a binder for electro-photographic layers.

It has now been found that it is particularly advantageous to use resinous substances which are soluble in organic solvents and which contain hydroxyl groups which have been wholly or in part reacted with isocyanate as binding agents for the aforementioned photo-conductive layers.

Monoisocyanates or polyisocyanates and more especially monoisocyanates alone or in admixture with diisocyanates, can be used for the reaction. The ratio between the reaction components can be so chosen that one or less than one NCO group is used for each one hydroxyl group. The following groups of resins which may be reacted with isocyanates to form the required resinous product are mentioned by way of examples:

A. Hydroxyl group containing polyesters obtained from polycarboxylic acids and polyhydric alcohols, the alcohol component being used in molar excess, so that the proportion of alcoholic hydroxyl groups to carboxyl groups is greater than one, preferably 1.3 to 3. The polycarboxylic acids mainly to be considered are aromatic dicarboxylic acids, such as phthalic acid, isophthalic acid, terephthalic acid, 4,4'-diphenyl ether dicarboxylic, furthermore, combinations of such aromatic acids with aliphatic polycarboxylic acids such as succinic acid, adipic acid, methyl adipic acid, sebacic acid, maleic acid, fumaric acid, decanedicarboxylic acid, dimerised oleic acid and citric acid. Furthermore, it is also possible to use minor proportions of monocarboxylic acid, such as for example benzoic acid, stearic acid, oleic acid, linseed oil fatty acid and ricinoleic acid, at the same time. Suitable quantities of these acids are for example 1 to 10% by weight of the polycarboxylic acids.

Examples of polyalcohols which can be used by themselves or in admixture for the production of the polyesters containing hydroxyl groups which may be mentioned are: glycol, diethylene glycol, triethylene glycol, butanediol, butenediol, butinediol, hexanediol, octadecanediol, hydroquinone dihydroxyethyl ether, linoleic acid monoglyceride, oleic acid monoglyceride, 4,4'- di-(β-hydroxyethoxy)-diphenyl dimethyl methane, 4,4'-dihydroxy dicyclohexyl dimethyl methane, glycerol, trimethylol ethane, trimethylol propane, trimethylol propane monoallyl ether, pentaerythritol, triethanolamine and castor oil.

It is also possible to use monofunctional alcohols, such as for example butanol, hexanol or octadecyl alcohol, concurrently in minor proportions to modify the polyesters. Quantities of about 1 to 10% by weight of the polyalcohols are to be considered for this purpose. The polyesters are obtained by known methods, for instance by thermal esterification of the aforementioned components in an inert atmosphere and under reduced pressure. Instead of the polycarboxylic acids disclosed above there may also be used the esters of said acids with monohydric saturated aliphatic alcohols having about 1–3 carbon atoms, such as methanol, ethanol, propanol. The polyesters preferably have hydroxyl numbers ranging between about 50 to 400 and acid numbers between about 0 to 40.

B. Epoxide resins, for example such derived from polyhydric phenols or polyhydric alcohols, which contain free hydroxyl groups present from their production or introduced by acid or alkali saponification of the epoxide groups. In addition, thermoplastic or soluble resins which are formed by the conversion of epoxide resins with monocarboxylic and/or polycarboxylic acids or their anhydrides or with phenols or amines; that is to say, quite generally resinous thermoplastic products based on epoxides and which contain hydroxyl groups from the outset or into which such groups have been introduced by known methods.

Suitable epoxide resins correspond for instance to the general formula:

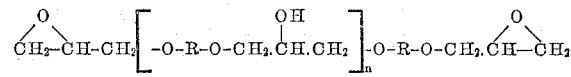

wherein $n$ is an integer of about 3 to 10 and R stands for the hydrocarbon nuclei of dihydric phenols (being free of functional groups other than phenolic hydroxy groups) such as resorcinol, hydroquinone, catechol, phloroglucinol, p-p'-dihydroxydiphenyl, p-p'-dihydroxy-diphenyl methane, p-p'-dihydroxydiphenyldimethylmethane, p-p'-dihydroxydibenzyl, bis-(4-hydroxyphenyl) sulfone. Such epoxides are for instance disclosed in U.S. patent specifications 2,633,458; 2,324,483; 2,444,333.

Further suitable polymeric alcohols are obtained by reacting polyepoxy compounds, preferably aliphatic diepoxides such as butylenedioxide, bis-(2,3-epoxypropyl) ether, the diepoxides of aliphatic polyhydric alcohols such as glycols (glycol, diglycol, butandiol) with dihydric phenols, if desired in the presence of monofunctional reactants, such as monoepoxy compounds (ethylene oxide, propylene oxide) or a monohydric phenol. Such polymeric alcohols are for instance disclosed in U.S. patent specifications 2,503,726; 2,615,007; 2,615,008. Furthermore, reference is made in this connection to U.S. patent specification 2,558,949 according to which polymeric alcohols are obtained by reacting a dihydric phenol with an epihalohydrin or a dihalohydrin and a monohalohydrin. Furthermore, the aforementioned epoxides may be reacted with alkaline metal hydroxides to convert the epoxy groups into the corresponding glycol groups. In case that the epoxides are reacted with monocarboxylic acids (propionic acid, stearic acid, benzoic acid, naphthoic acid) at temperatures of about 80–200° C. the epoxy groups are converted into the corresponding monoesterified glycol groups.

C. Resinous condensation products such as are obtained by the trans-etherification of compounds having two or more aromatically bonded —$CH_2.OR$— groupings with polyalcohols, the latter being used in excess. Products of this type are described in copending application Serial No. 724,840 filed in the names of G. Nischk, H.

Holtschmidt, W. Bongard and O. Bayer and having the title "Polyethers." These polyethers are produced by a process according to which an unsaturated polyhydroxy compound having the formula

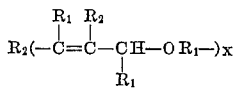

or

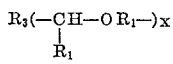

in which $R_1$ represents hydrogen, an alkyl or an aromatic radical, $R_2$ represents an aromatic, a cycloaliphatic or an aliphatic radical, $R_3$ represents an aromatic radical, and X is an integer of from 2 to 6, is reacted with other organic hydroxy compounds in the presence of an acid catalyst.

In reacting the unsaturated polyhydroxy compounds or their ethers of the above type formula with other organic hydroxy compounds, it is important that the group ($-CHR_1-OR_1-$) be attached to a carbon atom bearing a double bond. It is immaterial whether this double bond is an aliphatic or an aromatic double bond. Thus $R_3$ may be a benzene radical or any other aromatic radical, such as, for example, naphthalene, diphenyl ether, furan or thiophene. Aliphatic radicals having an $\alpha,\beta$ unsaturated group, such as, butadiene may likewise be used in the present process.

The unsaturated polyhydroxy compounds may be reacted as either the free hydroxy group containing compounds or as the ether of the free hydroxy group containing compounds as, for example, the methyl ether of the unsaturated polyhydroxy compound. These unsaturated polyhydroxy compounds or their ethers are condensed according to the present invention with other dihydric and polyhydric alcohols which may or may not have the same structure as that of the unsaturated polyhydroxy compounds. The unsaturated polyhydroxy and organic polyhydroxy compounds are heated in the presence of a small amount, preferably about 0.01% to about 1%, of any suitable acid catalyst which splits off water from the hydroxyl groups of the polyhydroxy compounds and the unsaturated polyhydroxy compounds to form ether linkages joining the two components together. If unsaturated polyhydroxy ethers are used in place of the unsaturated polyhydroxy compounds, alcohols are split off in place of water in the condensation reaction. Examples of such acid catalysts are, for example, p-toluene sulphonic acid, p-toluene sulphonic acid esters, benzene sulphonic acid, benzene sulphonic acid esters, phosphoric acids and their esters, and acid-treated bleaching earths, for instance acidic montmorillonites. If unsaturated polyhydroxy compounds having free hydroxyl groups, are used, water is split off during the condensation reaction which is removed from the reaction mixture by heating to a temperature of from about 140° C. to about 200° C. After condensing at this temperature the condensation is completed by applying a vacuum to the reaction mixture whereby the remaining water liberated during the condensation reaction is removed.

Solvents for organic polyhydroxy compounds may be used in the condensation reaction, but in most cases the use of a solvent is not needed. If a solvent is used, a solvent having a boiling point higher than water is necessary such as methyl naphthalene, decalin and diphenyl ether. The preferred boiling range for the solvent is from above 100° C. to about 200° C. After the removal of the water the polyether compounds prepared according to the invention are reasonably pure and do not normally require a separate purifying process.

The polyether compounds produced by the invention may contain terminal hydroxyl groups and by a suitable choice of the components it is also possible to prepare either straight chain or branched chained polyether compounds. The degree of branching of such polyether compounds can be varied by using mixtures of monohydric, dihydric or trihydric alcohols or an alcohol containing more than three hydroxyl groups. The polyether compounds produced by the invention have a molecular weight of from about 300 to about 10,000. The molecular weight may be varied by using an excess of polyalcohols such as, for example, hexanediol or diethylene glycol which by themselves do not condense with each other and because of this produce lower molecular weight compounds. It is also possible to admix polyhydric alcohols or their ethers for the condensation reaction. Examples of such compounds which may be admixed are benzyl alcohol, hydroxymethyl naphthalene, dodecyl alcohol or dibenzyl ether. Therefore the selection of the alcoholic compounds to be condensed with the unsaturated polyhydroxy compounds determine the molecular weight of the polyether compounds produced by the invention. As already mentioned above, the hydroxyl terminated unsaturated polyhydroxy compounds may be used to prepare polyether compounds having terminal hydroxyl groups. An excess of the unsaturated polyhydroxyether may also be used to produce polyether compounds having terminal ether groups. Also it is possible to use monohydric alcohols to condense with the unsaturated polyhydroxy compounds to prepare compounds having neither terminal hydroxyl nor terminal ether groups.

The unsaturated polyhydroxy compounds used in the present invention may be prepared by the degradation of condensation products of aromatic hydrocarbons and formaldehyde. The condensation products of aromatic hydrocarbons and formaldehyde are well known, see for example, Angew. Chemie, 1948, pages 88–96. The term "condensation products of aromatic hydrocarbons" also covers the condensation products of phenyl ethers, such as, for example, the condensation product of anisol and formaldehyde. The aromatic constituents of the condensation products are connected to one another by alkylene, benzyl acetal and dibenzyl ether groups. The condensation products may be degraded at elevated temperatures in the presence of acid catalysts or monfunctional, low molecular weight alcohols, such as, for example, methanol.

In the degradation reaction, the splitting off of the acetal groups, forms dialkyl acetals with the aldehydes that are liberated, and benzyl alkyl ethers are formed from the benzyl alcohols which are liberated. The dibenzyl ether groups are also split off and are converted into benzyl alkyl ethers. After degradation has taken place, it is advisable to separate out the dialkyl acetals from the reaction mixture such as, for example, by distillation which may be carried out under vacuum.

Any suitable catalyst may be used for the degradation reaction. Examples of such catalysts are acid reacting substances which accelerate the formation of the acetal group, such as, for example, hydrochloric acid, sulphuric acid, phosphoric acid and other mineral acids, organic sulphonic acids, their esters and chlorides, boron fluorides, sulphur dioxide or the like. The degradation may be carried out, for example, in a stirrer-type vessel. A pressure-type vessel may also be used for the degradation process. Temperatures of from about 70° C. to about 180° C. are particularly suitable for the degradation reaction. If methanol is used for the degredation reaction, the degree of degradation may be determined by finding the methoxy group and total oxygen content of the reaction product. For example, a product degraded at about 70° C. having an oxygen content of 9.7% has a methoxy group content of 5.1% corresponding to 2.6% of oxygen. Consequently, there remains a residual oxygen content of 7.1%, of which 4.6% is present in the form of free hydroxyl groups and the remaining 2.5% probably exist in the form of benzyl ether. With a degradation temperature of 100° C. the residual oxygen content falls to 3.1%. The residual oxygen content falls to 1.4% at a degration temperature of 120° C. and to 0.6% at a degradation temperature of 150° C. The products no longer contain any free hydroxy groups. As shown from the total oxygen content, about 9.3% to about 8.7% of the oxygen present is in the form of methoxy groups. Corresponding to the increased degree of splitting which occurs as the degradation temperature rises, the molecular weight of the degradation products falls from about 410 at 70° C. to about 260 at 150° C.

Any other suitable unsaturated polyhydroxy compound may be used in the invention in place of the degradation products of aromatic hydrocarbons and formaldehyde. Examples of such unsaturated polyhydroxy compounds and their ethers which may be used for the present process are p-xylylene glycol, o-xylylene glycol, 1,3,4-trimethylol benzene, 1,3-dimethyl-4,6-xylylene glycol, 1,5-bis-hydroxy methyl naphthalene 4,4'-bis-hydroxy methyl diphenyl ether, 1,4-bis-hydroxy methyl thiophene and heptadiene (2,5)-di-1,7-ol and the like. The ethers of the above unsaturated polyhydroxy compounds may also be used in the condensation as, for example, the methyl, ethyl, propyl and allyl ethers, and more specifically, the p-xylylene glycol dimethyl ether or the 1,4-(butene-2)-dimethyl ether or the like.

The unsaturated polyhydroxy compounds or their corresponding ethers may be condensed with any suitable dihydric or polyhydric, aliphatic, cycloaliphatic or aromatic alcohol to produce the polyether compounds. Examples of such dihydric and polyhydric alcohols which may be used in the condensation are diethylene glycol, triethylene glycol, 1,5-pentanediol, 1,6-hexanediol, pentachlorophenyl glycerine ether, trimethylol propane, glycerine, pentaerythritol, the di-β-hydroxyethyl ethers of 4,4'-dihydroxydiphenyl dimethyl methane, of 1,5-dihydroxy naphthalene and of hydroquinone, tripropane monoallyl or diallyl ethers, hydroquinone and dihydroxy diphenyl dimethyl methane or the like. Polyhydroxy compounds which are already of higher molecular weight, such as, for example, polypropylene oxide and polytetrahydrofuran, hydroxyl polyesters, partially saponified polyvinyl acetate and hydroxyethylated phenolformaldehyde resins or the like may also be condensed with the unsaturated polyhydroxy compounds.

D. Polyhydroxy compounds obtained by condensation of polyalcohols with aldehydes, the polyalcohols which are preferred being those which do not form any cyclic acetals, such for example as hexanediol, butane-bis-β-dihydroxy ethyl ether and trimethylol propane trihydroxy ethyl ether and also aromatic polyalcohols with aliphatically bonded hydroxyl groups obtained by reacting aromatic polyhydroxy compounds with glycol chlorohydrin.

Primarily suitable as the aldehyde cmponent is formaldehyde, but other aldehydes, such for example as acetaldehyde, benzaldehyde or crotonaldehyde, can be used. These products are described in copending application Serial No. 616,629, filed on October 18, 1956, in the names of E. Müller and G. Braun. These polyacetals are obtained by the condensation of an aldehyde with a polyhydroxy compound. The condensation product of the aldehyde and polyhydroxy compound has within its chain an acetal grouping —O—CHR—O— wherein R is a member selected from the group consisting of hydrogen, an aliphatic hydrocarbon radical and an aromatic hydrocarbon radical. The hydrocarbon radical of the acetal grouping may be either branched or linear and either saturated or unsaturated.

The condensation product of the polyhydroxy compound and an aldehyde may be produced by any suitable conventional method for forming compounds of this type. Any suitable aldehyde may be used. Formaldehyde is preferred and it is preferably added as paraformaldehyde. If formaldehyde is condensed with a dihydric alcohol, an acetal having the grouping

—O—CH$_2$—O— is formed, whereas substituted acetals are formed if other aldehydes, such as, for example, acetaldehyde, propionaldehyde, butyric aldehyde, isobutyric aldehyde, benzaldehyde, cinnamic aldehyde, acrolein, crotonaldehyde, β-ethyl-α-methyl acrolein, α-methyl acrolein and the like, are utilized. Such acetals have the grouping

—O—CHR—O—

in which the R represents a side group of an aliphatic or aromatic hydrocarbon radical.

Any suitable polyhydroxy compound that will form an acetal with an aldehyde may be utilized in the condensation process with the aldehyde, but it is preferred to use a polyhydroxy compound that will not form cyclic acetals with the aldehyde. Examples of polyalcohols that are particularly advantageous in the condensation process are hexanediol, butane-bis-beta-dihydroxy-ethylether, trimethylol propane, dihydroxy-ethylether, diethylene glycol and other polyethylene glycols, aromatic polyalcohols having aliphatically bonded hydroxyl groups, such as, for example, the product obtained by reacting an aromatic polyhydroxy compound with glycol chlorhydrin and the following aromatic-type compounds:

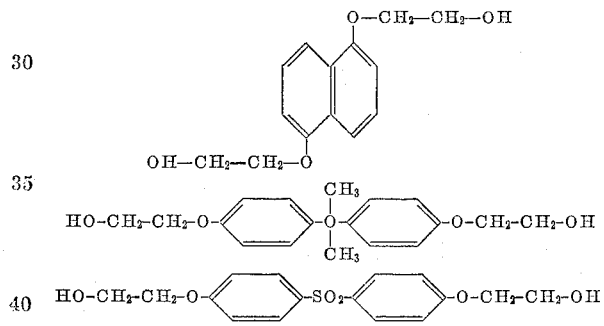

Low molecular weight hydroxyl polyesters, hydroxyl polyethers, hydroxyl polythioethers or monomeric glycols containing carbamide and urethane groupings, such as, for example, adipic acid diethanolamide or hexamethylene-beta-dihydroxyethyl urethane, may also be utilized in forming the condensation product with the aldehyde and such a process and the product thereof are contemplated by the invention. Moreover, mixtures of the various polyhydroxy compounds enumerated herein may be reacted with the aldehyde to form suitable acetals. By avoiding polyhydroxy compounds that form cyclic acetals, polymers are obtained having the —O—CHR—O— linkage. Furthermore, mixtures of compounds having the acetal linkage with polyhydroxy compounds not having such a linkage may be used.

It is preferred to use slightly more aldehyde than the theoretical amount in order to compensate for losses caused by vaporization during the condensation process. This is particularly true when the volatile aldehydes are utilized. Obviously, when a deficiency of aldehyde is present the size of the resulting molecule is less and the OH number is greater than when the theoretical amount of aldehyde is present to react with the polyhydroxy compound. In forming the condensation product, one molecule of aldehyde is used to link two molecules of the polyhydroxy compound in forming each

—O—CHR—O—

grouping within the chain of the finished product. Therefore, if only two molecules of the polyhydroxy compound were to be linked, only one molecule of the aldehyde would be required, but as the chain becomes longer, the ratio of the aldehydre molecules to polyhydroxy compound molecules approaches 1:1.

The condensation of the polyalcohols with aldehydes can take place in known manner, either in the form of a melt or at the boiling temperature of a solvent in the presence of acid catalysts, such as, for example, p-toluenesulfonic acid. It is, however, preferred to work in the presence of solvents which, like benzene, toluene or chlorobenzene, remove azeotropically the water of condensation which is split off. Heating is carried out until no more water distills off.

The condensation product obtained from the reaction between the aldehyde and the polyhydroxy compound is a viscous oil. The condensate may be either linear or branched as pointed out hereinbefore. Divalent alcohol and formaldehyde produce linear condensates, whereas alcohols having more than two hydroxyl groups when reacted with formaldehyde produce branched polymers. As pointed out above, the size of the molecule and the hydroxyl number is dependent upon the molecular ratio of aldehyde to polyhydroxy compound.

The following is a specific example of such a process:

About 900 grams of butanediol-1,4, about 316 g. of dimethylmethanediphenyl-4,4'-bis - beta - dihydroxyethyl ether and about 330 g. of paraformaldehyde are suspended in about 800 cc. of benzene and heated to the boiling point of benzene with addition of about 3 g. of p-toluene-sulfonic acid. An azeotropic mixture of water and benzene is distilled off until no more water passes over. Thereafter, the residual benzene is distilled off in vacuo at a pressure of about 20 mm. The resultant polyacetal has the hydroxyl number 65.

The polyhydroxy compounds mentioned under A to D, or other polyhydroxy compounds, and which have a molecular weight of about 500 to 4000 also mixtures thereof are reacted with isocyanates, preferably with heating to produce resins for use in the process of the present invention.

It is preferred to use those isocyanates which yield largely light-fast reaction products, such as for example: aliphatic, cycloaliphatic, aromatic, araliphatic mono-isocyanates such as butyl isocyanate, hexyl, isocyanate, cyclohexyl isocyanate, alpha phenyl ethylisocyanate p-tertiary-butyl-phenylisocyanate, furthermore, aliphatic, cycloaliphatic, aromatic, araliphatic diisocyanates such as toluylene-2,6-diisocyanate, diethyl methyl phenylene diisocyanates, 4,4'-dicyclohexyl methane diisocyanate, 4,4'-diphenyl dimethyl methane diisocyanate, m-xylylene diisocyanate 1 - α - isocyanato - ethyl-3-isocyanatobenzene, hexamethylenediisocyanate.

The quantities of isocyanate are so chosen that reaction products which are soluble in organic solvents, and which can still have free hydroxyl groups when using a deficiency of isocyanates, are obtained. In case of monoisocyanates the quantity of said components is so chosen that preferably 10 to 100% of the hydroxyl groups of the polyhydroxyl compounds are reacted with the isocyanates. The diisocyanates are preferably applied in combination with the monoisocyanates, whereby the quantity of the diisocyanate is so chosen that up to about 20% of the hydroxyl groups of the polyhydroxylic compounds are reacted with said diisocyanate, whereas the remaining hydroxyl groups may be wholly or partially reacted with monoisocyanates. It is furthermore possible to apply the diisocyanates by themselves, in which case such quantities are used as correspond up to about 20 percent of the hydroxyl groups of the polyhydroxyl compound.

The reaction of the isocyanates with the polyhydroxyl compounds is carried through by mixing the compounds in appropriate quantities and heating the mixture from about 80 to 200° C. for about 0.1 to 4 hours. It is possible to carry through the reaction in the presence of solvents such as esters (ethylacetate, butylacetate, Cellosolve acetate) ketones (acetone) aromatic hydrocarbons (benzene, toluene, xylene).

The reaction products obtained have no free isocyanate groups and are soluble in alcohols (methanol, ethanol, butanol) ketones (acetone) esters, ethers (dioxane, tetrahydrofurane). They have softening points between about 40 to 120° C.

The layers produced with these resins are fast to light and resistant to ageing and do not differ in their electrical properties from the silicone resin layers. Nevertheless they have the advantage of being more soluble in alcohol and also of being substantially cheaper to produce.

As light-sensitive or photo-conductive substances, it is possible to use the known compounds, for example zinc oxide, furthermore, the photoconductive oxides, sulfides, selenides, tellurides or iodides of cadmium, mercury, antimony, bismuth, thallium, molybdenum, aluminium, lead, zinc, moreover arsenic trisulfide, cadmiumarsenide, lead chromate, selenium and also anthracene, acenaphthene, chrysene, terphenyl or p-diphenyl benzene, benzanthrone, 1,5-dicyanonaphthalene, 1,4-dicyanonaphthalene, aminophthalodinitrile and nitrophthalodinitrile.

The production of the photo-conductive layers can be effected in the usual manner with the known compounds when using the above disclosed isocyanate resins as binders. The photo-conductive compounds may be dispersed in a solution of the present binding agents in an organic solvent or they may be dispersed in the binding agents at a temperature at which the binding agents are plastic.

One particular advantage of these isocyanate resins lies in the use thereof as aqueous dispersions. The production of such an aqueous dispersion which is suitable as a binder for the production of light-conductive layers is for instance carried out as follows.

A solution of the resin in trichlorethylene or a corresponding solvent is added while stirring to a molten emulsifier such as a reaction product of abietic acid with ethylene oxide. Thereafter the required amount of water is added with stirring to the aforementioned mixture. In order to incorporate the light-conductive substance into this dispersion, it is advisable to use a dispersion of said substance in an aqueous solution of a protective colloid, for example gum arabic, gelatine, polyvinylalcohol.

The binding agents are preferably applied in amounts of about 1 part by weight per 1 to 6 parts by weight of ZnO or other inorganic photoconductive substances and 0.5 to 3 parts by weight of organic photoconductive substances. The dry weight of the photoconductive layers is preferably adjusted to about 5–60 g. per square metre.

The layers cast from such an aqueous dispersion are dried at an elevated temperature, preferably of 60 to 90° C. They are then so hydrophobic that the absorption of moisture from the air is so slight that the process is not deleteriously affected even when the layers are exposed for a relatively long time to an air humidity of about 80–90%.

*Example 1*

200 g. of a polyester prepared by vacuum esterification of 3 mols of phthalic anhydride, 3 mols of trimethylol propane and 1 mol of pentaerythritol (containing 11.8% by weight of hydroxyl groups, acid number 2) have added thereto at 140–170° C. 5 mols of cyclohexyl isocyanate. The reaction mixture is then heated for 2 hours at 170° C. The resin obtained has a softening point of 94° C. and is easily soluble in acetone, ethanol, ethyl-acetate, methylglycolacetate. This resin is dissolved in 1000 cc. of alcohol. 600 g. of zinc oxide are incorporated into this resin solution by stirring and the mixture is treated for several hours in a ball mill. It is then cast on to a suitable support, for example paper, and can be dried at room temperature.

*Example 2*

A polyester is prepared by vacuum esterification of 3 mols of phthalic anhydride, 3 mols of trimethylol propane, 1 mol of pentaerythritol and 1 mol of a monocarboxylic fatty acid ($C_9$–$C_{10}$). The polyester has 9.1% by weight of hydroxyl groups and an acid number of 2.4. 250 parts by weight of this polyester are reacted for 2.5 hours at 170° C. with 4.8 mols of cyclohexyl isocyanate. 250 parts by weight of the reaction product which as an OH content of 1.18% by weight have added thereto 1000 parts by weight of alcohol, the combination then being mixed with 750 parts by weight of zinc oxide in a ball mill and shaken. The mixture is ready for use when the resin has completely dissolved in the alcohol. The further processing is as in Example 1.

Example 3

300 parts by weight of a reaction product prepared by vacuum esterification of 2 mols of phthalic anhydride, 1 mol of adipic acid and 4 mols of trimethylol propane and subsequent reaction with 4.8 mols of cyclohexyl isocyanate are dissolved in 1000 parts by weight of alcohol. 670 parts by weight of zinc oxide are introduced and the mixture is shaken on a vibratory ball mill. The mixture is cast into a suitable support and dried.

Example 4

200 parts by weight of a reaction product prepared as described in Example 2, save that the cyclohexyl isocyanate is replaced by the equivalent amount of benzyl isocyanate, are dissolved in 1000 parts by weight of alcohol. 200 parts by weight of p-diphenyl benzene are introduced into this solution and the mixture shaken on a ball mill. The further processing is as in Example 1.

Example 5

1000 parts by weight of a 20% solution in alcohol of the reaction product described in Example 1, 900 parts by weight of zinc oxide and 0.13 part by weight of Bengal pink are mixed in a ball mill and ground. The mixture is cast on paper and dried.

Example 6

100 parts by weight of an epoxide resin prepared in the usual way from 4,4'-dihydroxy diphenyl dimethyl methane and epichlorhydrin in an alkaline medium and having an epoxide equivalent of 1150 and 0.12% of active hydrogen atoms are reacted first for one hour with 10.6 parts by weight of benzoic acid at 150° C. The resulting resinous product containing 5.8% of hydroxyl groups is then aftertreated at 140–160° C. for two hours with 34 parts by weight of cyclohexyl isocyanate.

100 parts by weight of this reaction product (having 1% by weight of hydroxyl groups and 0% of NCO groups) are dissolved in 400 parts by weight of ethyl acetate. 380 parts by weight of zinc oxide are introduced and the mixture shaken for some hours on a ball mill. The further processing is as in Example 1.

Example 7

233 parts by weight of a polyester obtained by normal vacuum esterification from 3 mols of phthalic anhydride, 3 mols of trimethylol propane, 0.5 mol of pentaerythritol, and 0.4 mol of castor oil containing 7.0% by weight of hydroxyl groups and having an acid number of 2.4 are reacted at 140–170° C. initially with 8.1 parts by weight of hexamethylene diisocyanate and thereafter at the same temperature in one case with 49 parts and in another case with 8.5 parts by weight of cyclohexyl isocyanate. The resins obtained are easily soluble in acetone, ethylacetate, methyl glycol ether acetate and have OH contents of 3 and 1.1% by weight respectively.

200 parts by weight of the resulting resin are dissolved in 600 parts by weight of acetone. 520 parts by weight of zinc oxide are introduced and the mixture shaken for some hours on a ball mill. The further processing is as in Example 1.

Example 8

129 parts by weight of a polyether resin with an OH number of 334, prepared by reacting at 80–180° C. 1.5 mols of 4,4'- dichloromethyldiphenyl ether and 2 mols of trimethylol propane in the presence of ethyleneoxyde as binding agent for hydrochloric acid while distilling off the formed glycolchlorhydrin, are reacted at 140–160° C. with a mixture of 7.7 parts by weight of m-xylylene diisocyanate and 72 parts by weight of cyclohexyl isocyanate. After about 2 hours it is no longer possible to detect any free isocyanate.

100 parts by weight of this resin, which gives clear solutions in acetone, ethyl acetate, and methyl glycol ether acetate, are dissolved in 580 parts by weight of methyl glycol ether acetate and mixed with 460 parts by weight of zinc oxide. The mixture is treated on a grinder assembly and worked up as described in Example 1.

Example 9

40 parts of resin as used in Example 1 are dissolved in 40 parts of a molten emulsifier (for instance reaction product of abietic acid with ethylene oxide), and 160 parts of toluene are added thereto. The mixture has slowly added thereto while stirring 100 parts of water, and the product of triturating 300 parts of zinc oxide with 225 cc. of an aqueous 2% gum arabic solution is incorporated in the dispersion. The mixture is ground for several hours on a ball mill and cast in the usual manner. The layers thus cast are dried at 75° C.

The photoconductive layers according to the invention may be used in the usual manner. The materials are first made sensitive to light by giving them an electrostatic charge on the coating side in the dark, for instance by means of a corona discharge. The material is then exposed by any of the conventional photographic procedures. The latent image obtained is developed by applying a pigmented resin powder carrying an electrostatic charge which is opposite to that of the photoconductive layer. The powder image produced is then fixed by melting the resin powder.

We claim:

In a process for producing electrostatic images employing an electrophotographic plate comprising a base plate provided with a photoconductive insulating layer, the latter containing a photoconductive substance dispersed in a binder, the photoconductive substance being selected from the group consisting of organic and inorganic photoconductors, the proportion of inorganic photoconductors being from 1 to 6 parts of photoconductor to 1 part of binder, and the proportion of organic photoconduct or being from 0.5 to 3 parts of photoconductor to 1 part of binder, producing an electrostatic image on said layer by giving it an electrostatic charge in the dark and exposing it to the original to be reproduced, and developing said electrostatic image with a finely divided developer substance, the improvement which comprises employing as the binder the reaction product of a resin containing free hydroxyl groups and an isocyanate, said reaction product being soluble in organic solvents and practically free of unreacted isocyanate groups, said reaction product being selected from the group consisting of (a) the resin obtained by reacting cyclohexylisocyanate at elevated temperatures with a polyester prepared by the esterification of phthalic anhydride with trimethylol propane and pentaerythritol; (b) the resin prepared by reacting cyclohexylisocyanate at elevated temperatures with a polyester prepared by the esterification of phthalic anhydride with trimethlol propane, pentaerythritol, and a monocarboxylic fatty acid; (c) the resin obtained by reacting a cyclohexylisocyanate at elevated temperatures with a polyester prepared by the esterification of phthalic anhydride and adipic acid with trimethylol propane; (d) the resin obtained by reacting benzylisocyanate at elevated temperatures with a polyester prepared by the esterification of phthalic anhydride and a monocarboxylic fatty acid with trimethylol propane and pentaerythritol; (e) the resin obtained by reacting hexamethylene diisocyanate at elevated temperatures with a polyester prepared by the esterification of phthalic anhydride with trimethylol propane, pentaerythritol, and castor oil; and (f) the resin obtained by reacting cyclohexylisocyanate at elevated temperatures with a polyester prepared by the esterification of phthalic anhydride with trimethylol propane, pentaerythritol, and castor oil.

References Cited in the file of this patent
UNITED STATES PATENTS

| | | |
|---|---|---|
| 2,287,348 | Hayden | June 23, 1942 |
| 2,297,691 | Carlson | Oct. 6, 1942 |
| 2,302,037 | Kollek | Nov. 17, 1942 |
| 2,663,636 | Middleton | Dec. 22, 1953 |
| 2,805,159 | Unkauf | Sept. 3, 1957 |
| 2,807,545 | Frederick | Sept. 24, 1957 |
| 2,808,391 | Pattison | Oct. 1, 1957 |
| 2,846,309 | Land | Aug. 5, 1958 |
| 2,862,815 | Sugarman | Dec. 2, 1958 |
| 2,866,878 | Briggs et al. | Dec. 30, 1958 |

FOREIGN PATENTS

| | | |
|---|---|---|
| 203,907 | Australia | Nov. 1, 1956 |
| 716,071 | Great Britain | Sept. 29, 1954 |

OTHER REFERENCES

Metcalfe et al.: Journal of Oil and Colour Chemists Association, vol. 39, No. 11, November 1956, pp. 845–856.

Abernathy: Rubber World, March 1955, vol. 131, No. 6, pp. 765–769.

Bayer: Modern Plastics, June 1947, pp. 149–262.

Allsebrook: Paint Manufacture, December 1955, pp. 459–469.

Day: "Irradiation Induced Photoconductivity in Magnesium Oxide," Phys. Rev., 91 (1), July 1 (1953), p. 238.